United States Patent
Bontempi et al.

(10) Patent No.: US 7,196,734 B2
(45) Date of Patent: Mar. 27, 2007

(54) ELIMINATION OF FIXED, EDGE-JUSTIFIED INFORMATION BANDS FROM TELEVISION DISPLAY IMAGES

(75) Inventors: Raymond Bontempi, Jamison, PA (US); Joseph F. Halgas, Jr., Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 126 days.

(21) Appl. No.: 10/719,512

(22) Filed: Nov. 21, 2003

(65) Prior Publication Data

US 2005/0110904 A1    May 26, 2005

(51) Int. Cl.
*H04N 9/74* (2006.01)
*H04N 5/50* (2006.01)

(52) U.S. Cl. ........................... 348/581; 348/553
(58) Field of Classification Search ............... 348/578, 348/607, 581, 580, 704, 903, 553, 445, 563, 348/564, 569, 913, 561; 725/41–44, 25, 725/32–37; *H04N 5/50, 5/445, 9/74*
See application file for complete search history.

(56) References Cited

U.S. PATENT DOCUMENTS

| | | | | | |
|---|---|---|---|---|---|
| 5,874,985 | A | * | 2/1999 | Matthews, III | ............... 725/32 |
| 5,903,315 | A | * | 5/1999 | Itoh et al. | .................... 348/564 |
| 6,130,722 | A | * | 10/2000 | Bae et al. | .................... 348/564 |
| 6,459,906 | B1 | * | 10/2002 | Yang | ........................... 348/552 |
| 6,469,753 | B1 | * | 10/2002 | Klosterman et al. | ........ 348/563 |
| 6,564,379 | B1 | * | 5/2003 | Knudson et al. | .............. 725/42 |
| 6,822,699 | B2 | * | 11/2004 | Furui | .......................... 348/564 |
| 6,833,874 | B2 | * | 12/2004 | Ozaki et al. | ................. 348/564 |

\* cited by examiner

*Primary Examiner*—Sherrie Hsia
(74) *Attorney, Agent, or Firm*—Benjamin D. Driscoll

(57) ABSTRACT

A technique is described that allows a viewer to eliminate a fixed information band portion of a television image (e.g., a scrolling news "crawl" or fixed advertising band) from a television display by "stretching" the main program portion to fill the screen, effectively pushing the undesired crawl or advertising band off of the display. This eliminates a feature of many television broadcasts that many viewers find distracting and/or annoying, and helps to prevent phosphor burn on phosphor-based display screens.

15 Claims, 3 Drawing Sheets

ELIMINATION OF FIXED, EDGE-JUSTIFIED INFORMATION BANDS FROM TELEVISION DISPLAY IMAGES

FIELD OF THE INVENTION

The present invention relates to the processing of video and more particularly to processing of specific visual elements of a television broadcast.

BACKGROUND

In recent years, the number of television broadcasts (most notably news, weather, financial, and sports broadcasts) that are instituting a visual feature known as a "news crawl" to their programming has been steadily increasing. The "news crawl" is typically implemented as a scrolling textual information display located in a small dedicated band across the bottom 5% to 8% of the screen during broadcasts. This dedicated band typically extends across the entire width of the screen and is just sufficient in height to fit a single line of right-to-left scrolling text.

The news crawl usually carries a continuously updated series of short informational messages related to current news, weather, financial news and/or sports. Although typically presented as a bottom-justified scrolling band as described above, a news crawl can be placed along a left, right or top edge of the display screen.

While some television viewers find news crawls useful and informative, many find them distracting and/or annoying and would prefer to view television broadcasts without them. Despite the preference of some viewers for an "unadorned" television broadcast, the news crawl seems to have become an expected, if sometimes unwelcome standard feature of mainstream television news programming.

In addition, some networks (e.g., TNN) display a fixed advertising bar along an edge of the screen (usually the bottom edge), even during movies and other programming. Due to the fixed display location of advertising bars and news crawls, they can produce an effect known as "phosphor burn." Phosphor burn is "burnout" or damage to luminous phosphors (on phosphor-based displays such as CRTs) that occurs when a fixed or substantially fixed pattern is displayed for long periods of time. This effect is well known in computer displays, where "screen savers" that prevent long-term display of fixed information have become a popular remedy. The effects of phosphor burn can often be seen on airport and pub television screens where the television is tuned to one channel (e.g., a news or sports channel that displays a crawl or fixed advertising bar) with a static or nearly static video display for long periods of time. Phosphor burn reduces the brightness and contrast of only the affected area of the screen, resulting in a ghost like permanent image being "burned onto" the display. The burned image cannot be repaired and creates a highly distractive area on the display screen for the viewer. Areas of the screen that are not subjected to the fixed pattern crawl or advertising bar are relatively unaffected.

In light of the foregoing, it would be desirable to provide a means by which a viewer could eliminate fixed advertising bars and/or news crawls from a television display screen.

SUMMARY OF THE INVENTION

The present inventive technique permits a television user to eliminate a news crawl or advertising band from a television display by "stretching" the remaining portion of the television image to fill the entire display.

According to the invention, a television broadcast that incorporates a fixed information band feature (such as a news crawl or fixed advertising band) exhibits a display image that is divided into a main program display portion that occupies most of the image area and a fixed information band display portion that occupies a small rectangular area along one edge of the display image. A user input device such as a remote control, front panel button, etc., is provided so that a user can issue a command to eliminate the fixed information band display portion from the display image. In response to the user command, a video stretching device re-scales the main program display portion to occupy substantially the whole image area, effectively "covering over" the fixed information band display portion or pushing the fixed information band display portion off of the display image. The resultant display shows only the re-scaled main program portion.

Typically, the fixed information band display portion is located along a bottom edge of the display image, and the main program portion is re-scaled vertically in top-down fashion to fill substantially the entire display image area. However, according to various aspects of the invention, the fixed information band display portion can be located along a top edge, a left edge or a right edge of the display image area. Accordingly, the main program display portion is re-scaled vertically in bottom-up fashion, horizontally in right-to-left fashion or horizontally in left-to-right fashion, respectively, for each of these cases.

According to an aspect of the invention, when the fixed information band display portion can occur along more than one edge of the display image, user input means can be provided for indicating the display image edge along which the fixed information band display portion occurs. The main program display portion is then re-scaled accordingly.

According to another aspect of the invention, user input means can be provided for indicating the size (typically 5% to 8% of total display area) of the fixed information band display portion. The scale factor used to re-scale the main program display portion can then be adjusted accordingly.

BRIEF DESCRIPTION OF THE DRAWINGS

These and further features of the present invention will be apparent with reference to the following description and drawing, wherein.

DETAILED DESCRIPTION OF THE INVENTION

Typically, a displayed television image for a television broadcast that incorporates a news crawl or a fixed advertising band is divided into two portions: a main program portion and a fixed information band portion. The main program portion displays normal motion video. The band portion occupies about 5% to 8% of the total display area in a fixed rectangular area along the entire length of one edge of the television screen (usually the bottom edge) and displays scrolling text, advertisements or other information. The present inventive technique allows a television viewer to eliminate the band portion of the image (e.g., news crawls or fixed advertising bands) from the television display by "stretching" the main program portion to fill the screen, effectively pushing the undesired crawl or advertising band off of the display.

Numerous efficient techniques for accomplishing video (image) stretching are known in the art. For example, U.S. Pat. No. 5,781,241, "Apparatus And Method To Convert Computer Graphics Signals To Television Video Signals With Vertical And Horizontal Scaling Requiring No Frame Buffers", issued Jul. 14, 1998 to Donovan (hereinafter "DONOVAN") describes a technique for scaling (stretching) a computer-generated television image vertically and/or horizontally to fit a television display screen. Another example is given in U.S. Pat. No. 5,574,572, "Video Scaling Method and Device", issued Nov. 12, 1996 to Malinowski, et al. (hereinafter "MALINOWSKI"), which describes an interpolative technique for vertical and/or horizontal scaling of a video image, with independent control over vertical and horizontal scale factors.

Figure 1:
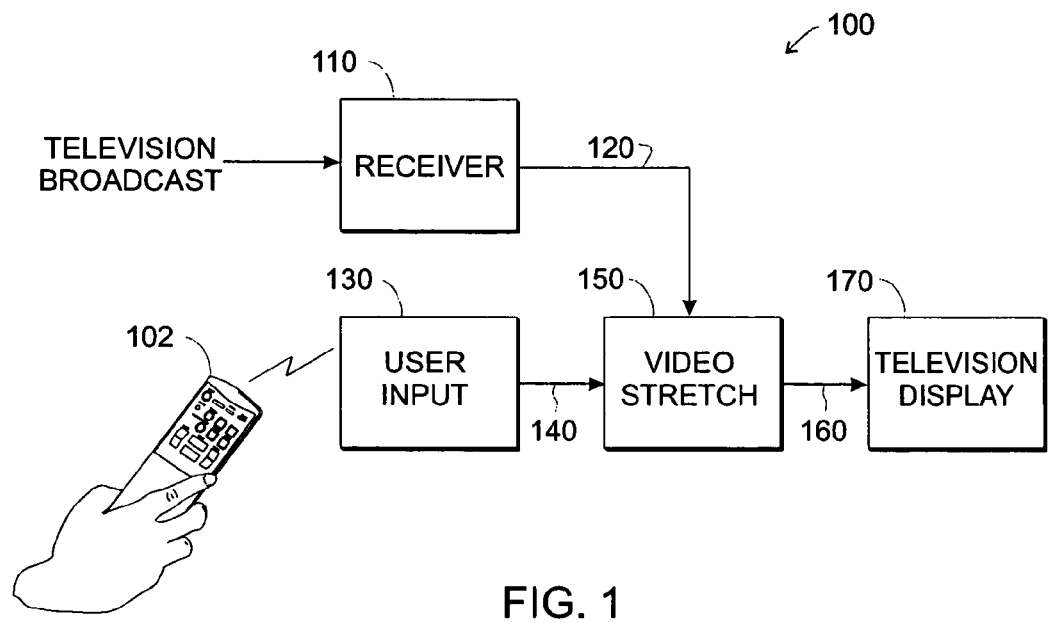
FIG. 1 is a block diagram of a system for eliminating a fixed advertising band or news crawl from a television broadcast, in accordance with the invention.

FIG. 1 is a block diagram of a system 100 for eliminating a fixed band portion of a television broadcast from a television display screen, according to the invention. A television receiver 110 receives a "raw" television broadcast and produces a corresponding "raw" pixel stream 120. The raw television broadcast may contain a news crawl or fixed advertising band. The raw pixel stream 120 is processed by a video stretch device 150, and produces an output pixel stream 160. The output pixel stream 160 can then be displayed on a suitable television display 170 where it can be viewed. The raw television broadcast can be received via a conventional antenna system, via a cable, or via a satellite system.

When not activated, the video stretch device 150 is set to a "bypass" mode, whereby the raw pixel stream is not scaled (i.e., it is set for 1:1 scaling in both horizontal and vertical directions). If a user determines that the displayed television image contains a news crawl or fixed advertising band that he wishes to eliminate from the display, the user commands the system 100 to do so via a user input function 130. As shown in FIG. 1, the user input function 130 receives user input from, e.g., a remote control 102. Alternatively, such user input can come from a button provided on a set-top box, television appliance, or the like or from a network to which a user interface device (e.g., PDA, PC, etc.) is connected. Upon receiving the command from the user, the user input function 130 would recognize the user request and issue a command 140 to the video stretch device 150 to re-scale the output pixel stream 160 with respect to the raw pixel stream 120. In this manner, the main program is scaled in the output pixel stream 160 to occupy substantially the entire television display area, thereby eliminating the fixed band portion (the "crawl" or fixed advertising band) from the output pixel stream 160.

The video stretch device 150 can be implemented by any suitable means, such as those described in DONOVAN and MALINOWSKI. The scale factor and direction can be determined by prior knowledge of the television broadcast content (e.g., based upon the currently selected television channel), can be user-specified (e.g., via scale factor buttons on the remote control or other user input device), or can be fixed. The user input device can be provided with a single "no crawl" button, can be provided with one or more buttons for indicating which edge of the television display is associated with the fixed band portion of the television broadcast, or can be adapted to accept multi-button sequences from the user.

In the case where prior knowledge of the television broadcast content is used, the user-input function can be provided with pre-stored information about the screen location and size of fixed band portions of television programming broadcast by specific channels. When the user signals that a "no crawl" display mode is desired, the user input device signals the video stretch device with appropriate scaling information based upon pre-stored fixed-band data associated with the currently selected channel. The pre-stored fixed-band data can be maintained, for example, in a look-up table (e.g., ROM or non-volatile RAM) accessed by the video stretch device 150 upon receipt of the stretch command 140.

In the case where the location and/or size of the fixed-band portion is specified by the user, the user-input device can be provided with separate buttons for left-edge, right-edge, bottom-edge and top-edge "crawl" locations. Alternatively, multiple presses of a single button can be used to "cycle" through a variety of location and/or size options.

Typically, a news crawl (or advertising band) appears in a fixed band along the bottom edge of the television display and occupies the bottom 5% to 8% of the display screen. This suggests a simpler, fixed-function "no-crawl" command that a user can issue (e.g., via a remote-control button) to cause the raw pixels of the television broadcast to be expanded vertically by a fixed amount, e.g., by a factor of 105.3% starting at the top of the display, to fill the entire display screen on the assumption that the crawl is located in the bottom 5% of the raw television broadcast.

A simple enhancement to this fixed function approach is to permit additional button presses to cause the system 100 to cycle though a limited set of vertical (or horizontal) scale factors between 5% and 8%. A similar approach can be used in the case where the user specifies the edge location via a dedicated button. Multiple presses of the same button can be used to cycle through a limited set of vertical or horizontal scale factors (as appropriate for the selected edge).

Upon changing channels (or switching between video sources) the stretch mode of operation can be cancelled, effectively resetting the video stretch device to a "bypass" mode.

Figure 2:
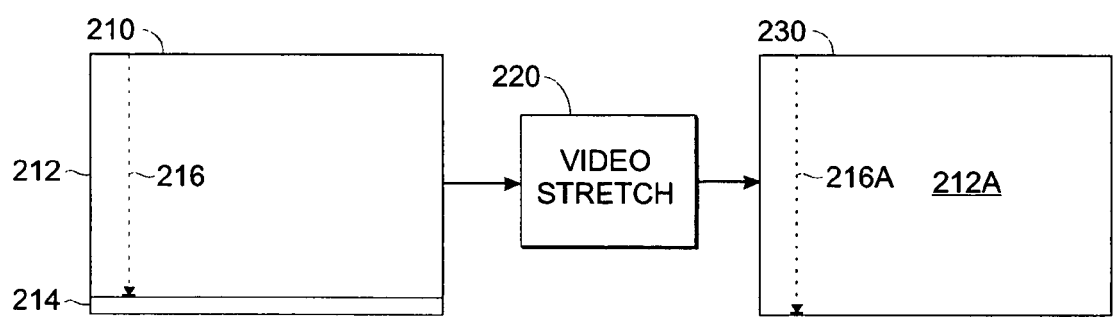
FIG. 2 is a diagram illustrating removal of a bottom-justified fixed advertising band or news crawl from a television broadcast, in accordance with the invention.

FIG. 2 is a processing flow diagram showing display representations before and after scaling for a bottom justified fixed-band portion, in accordance with the invention. A raw image display 210 corresponding to a raw television broadcast (for which a raw pixel stream has been received) is divided into a main program portion 212 and a fixed band portion 214. The fixed band portion 214 occupies a small portion of the image space (display space) along a bottom edge of the raw image display 210. The main program portion 212 has a height 216 (indicated by a dashed arrow line) equal to the distance from the top of the raw image display 210 to the top of the fixed band portion 214. A video stretch function 220 (e.g., implementing a suitable stretch technique such as those described in DONOVAN and MALINOWSKI) operates on the raw image pixel stream associated with the raw image display 210 to produce an output pixel stream represented by output display 230. The video stretch function 220 is adapted to expand the main program portion 212 of the raw image display 210 vertically in top-down fashion to produce a stretched main program portion 212A whose height 216A is substantially equal to the height of the output display 230.

Figure 3:
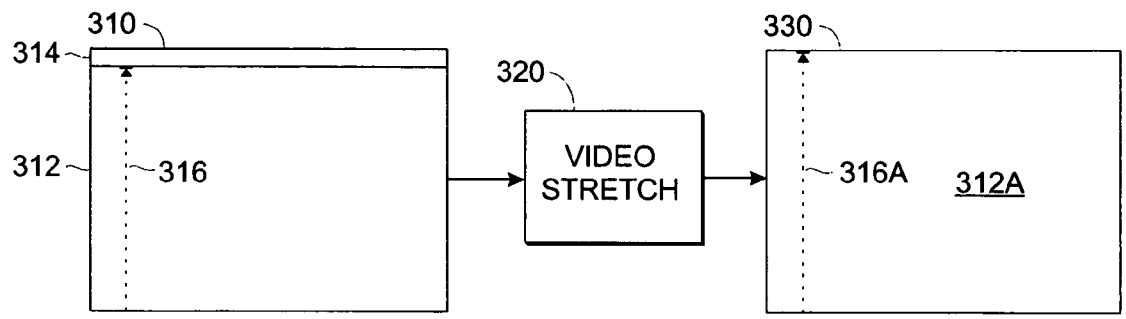
FIG. 3 is a diagram illustrating removal of a top-justified fixed advertising band or news crawl from a television broadcast, in accordance with the invention.

FIG. 3 is a processing flow diagram showing display representations before and after scaling for a top justified fixed-band portion, in accordance with the invention. A raw image display 310 (compare 210) corresponding to a raw television broadcast (for which a raw pixel stream has been received) is divided into a main program portion 312 and a top-justified fixed band portion 314. The fixed band portion 314 occupies a small portion of the image space (display space) along a top edge of the raw image display 310. The main program portion 312 has a height 316 (indicated by a dashed arrow line) equal to the distance from the bottom of the raw image display 310 to the bottom of the top-justified fixed band portion 314. A video stretch function 320 (compare 220) operates on the raw image pixel stream associated with the raw image display 310 to produce an output pixel stream represented by output display 330 (compare 230). The video stretch function 320 is adapted to expand the main program portion 312 of the raw image display 310 vertically in bottom-up fashion to produce a stretched main program portion 312A whose height 316A is substantially equal to the height of the output display 330.

Figure 4:
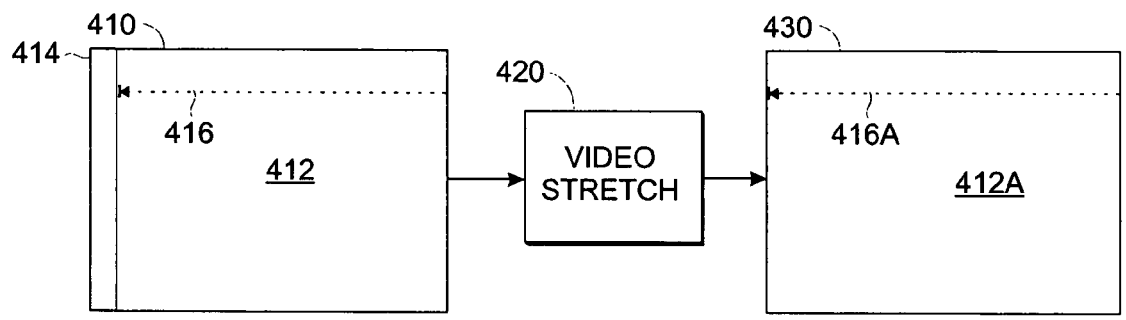
FIG. 4 is a diagram illustrating removal of a left-justified fixed advertising band or news crawl from a television broadcast, in accordance with the invention.

FIG. 4 is a processing flow diagram showing display representations, before and after scaling, for a left justified fixed-band portion, in accordance with the invention. A raw image display 410 (compare 210, 310) corresponding to a raw television broadcast (for which a raw pixel stream has been received) is divided into a main program portion 412 and a left-justified fixed band portion 414. The fixed band portion 414 occupies a small portion of the image space (display space) along a left edge of the raw image display 410. The main program portion 412 has a width 416 (indicated by a dashed arrow line) equal to the distance from the right edge of the raw image display 410 to the right side of the fixed band portion 414. A video stretch function 420 (compare 220, 320) operates on the raw image pixel stream associated with the raw image display 410 to produce an output pixel stream represented by output display 430 (compare 230, 330). The video stretch function 420 is adapted to expand the main program portion 412 of the raw image display 410 horizontally in right-to-left fashion to produce a stretched main program portion 412A whose width 416A is substantially equal to the width of the output display 430.

Figure 5:
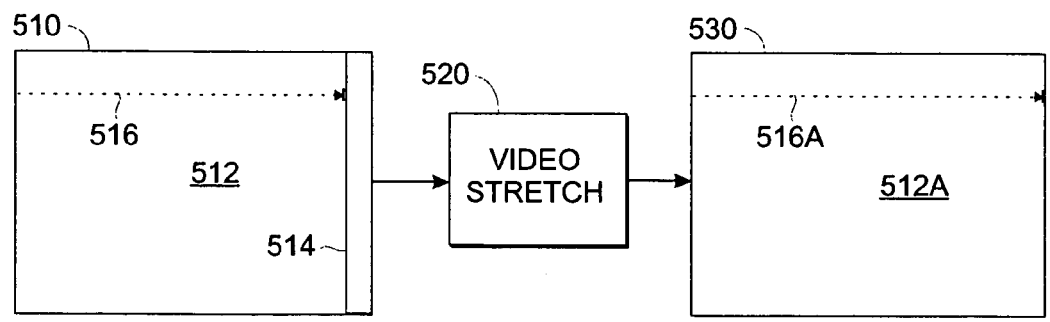
FIG. 5 is a diagram illustrating removal of a right-justified fixed advertising band or news crawl from a television broadcast, in accordance with the invention.

FIG. 5 is a processing flow diagram showing display representations, before and after scaling, for a right-justified fixed-band portion, in accordance with the invention. A raw image display 510 (compare 210, 310, 410) corresponding to a raw television broadcast (for which a raw pixel stream has been received) is divided into a main program portion 512 and a right-justified fixed band portion 514. The fixed band portion 514 occupies a small portion of the image space (display space) along a right edge of the raw image display 510. The main program portion 512 has a width 516 (indicated by a dashed arrow line) equal to the distance from a left edge of the raw image display 510 to a left side of the fixed band portion 514. A video stretch function 520 (compare 220, 320, 420) operates on the raw image pixel stream associated with the raw image display 510 to produce an output pixel stream represented by output display 530 (compare 230, 330, 430). The video stretch function 520 is adapted to expand the main program portion 512 of the raw image display 510 horizontally in left-to-right fashion to produce a stretched main program portion 512A whose width 516A is substantially equal to the width of the output display 530.

Figure 6:
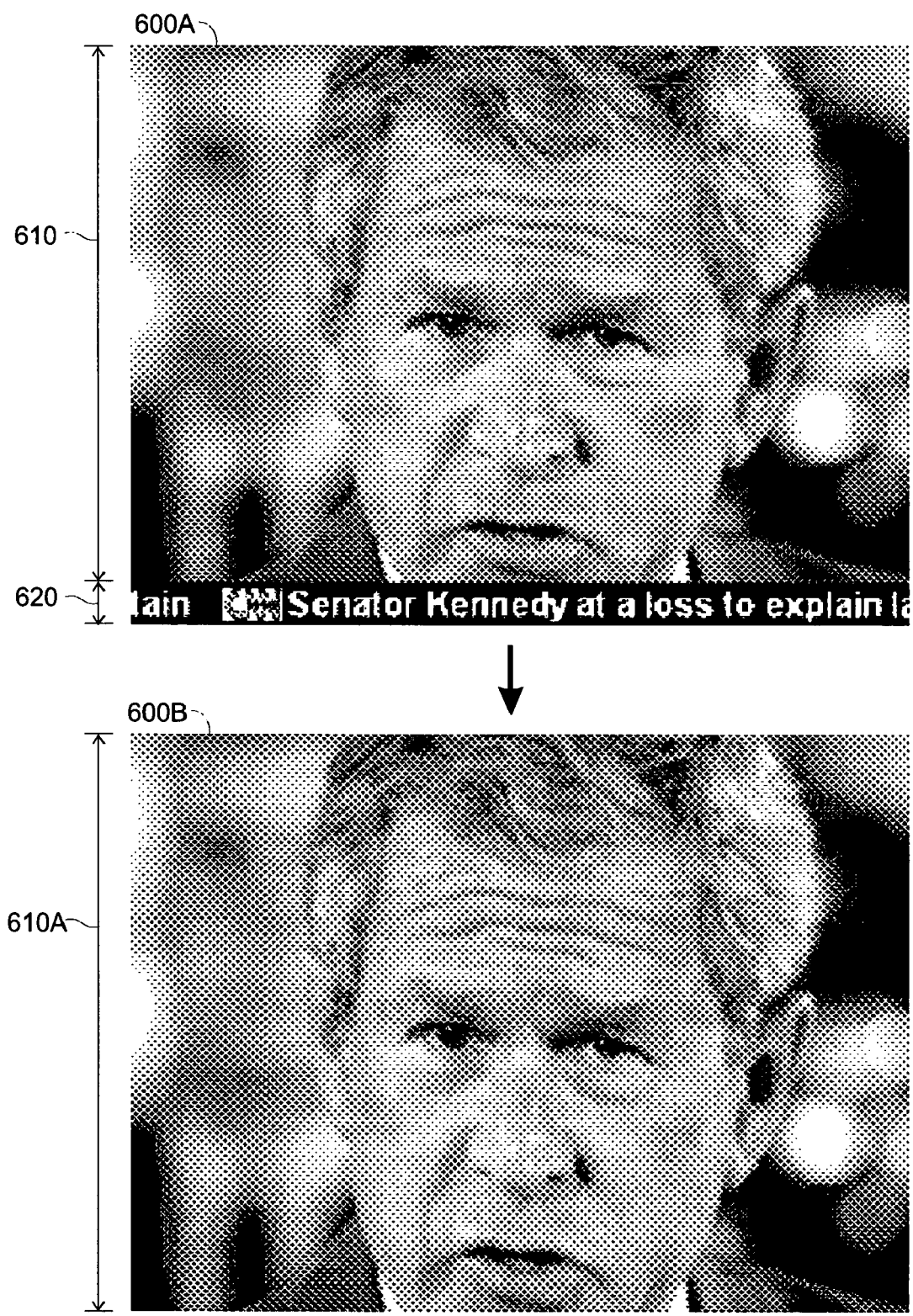
FIG. 6 is a before/after pair of television display images, illustrating the visual effect of removal of a fixed advertising band or news crawl from a television broadcast, in accordance with the invention.

FIG. 6 is a before/after pair of television display images, illustrating the visual effect of removal of a fixed advertising band or news crawl from a television broadcast, in accordance with the invention. In FIG. 6, a "before" image 600A exhibiting a main program portion 610 and a fixed-band "news crawl" portion 620 is shown. The fixed band portion 620 occupies a small space across a bottom edge of the "before" image 600A. The "before" image is typical of a "raw" television broadcast with a "news crawl" feature, as described hereinabove.

Processing of the "before" image 600A (by operating on a raw pixel stream associated with the before image 600A, as described hereinabove) produces the resultant display shown in an "after" image 600B, with a "stretched" main program portion 610A (derived from the main program portion 610 in the "before" image 600A) that has been stretched vertically in top-down fashion to fill the entire "after" image 600B. Although the aspect ratio of the stretched main program portion 610A is different from that of the main portion 610, it is only slightly different (e.g., 5% to 8% stretch) such that the visual impact of this change in aspect ratio is quite subtle.

It will be evident to those of ordinary skill in the art that the inventive "stretching" technique for removal of fixed information band portions of a television broadcast image is compatible with any other stretch or zoom modes that may be employed by a set-top box or TV set. If the viewer is using a horizontal stretch mode, for instance, to fill a 16:9 display with 4:3 video (i.e., for fitting standard 4:3 NTSC video to a wide screen television display), the inventive video stretching technique is applied in addition to the horizontal stretch. For example, in the case where a bottom justified "news crawl" is present in a standard 4:3 aspect ratio NTSC image that is being stretched horizontally for display on a wide screen television display, the net result is a 33% horizontal stretch to fill the 16:9 display with 4:3 tuned video and a 5% to 8% top-down vertical stretch to remove the news crawl from the bottom of the screen.

Although the invention has been shown and described with respect to a certain preferred embodiment or embodiments, certain equivalent alterations and modifications will occur to others skilled in the art upon the reading and understanding of this specification and the annexed drawings. For example, although a preferred embodiment is to incorporate the video stretch apparatus into a television set, so that the output signal from the receiver is already stretched to remove the objectionable region of the source video, other implementations are possible. One possible alternative implementation could comprise a stand-alone in-line stretch processor between the receiver (e.g., set-top box) and the television set. Such an in-line stretch device, however, would require extra connections and an extra remote control.

Moreover, with regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A system for allowing a user to eliminate a fixed information band portion of a television broadcast, comprising:
   means for receiving a television broadcast image, said image having a display area divided into a fixed information band display portion along an edge thereof, and a main program display portion;
   means for receiving a user command to eliminate said fixed information band display portion from a television display representation of said broadcast image;
   means, responsive to said user command, for re-scaling the main program display portion of said television broadcast image in size to occupy substantially the entire display area of said television broadcast image and for providing said re-scaled main program display portion as an output for display on a television screen.

2. A system according to claim 1, wherein:
   said fixed information band display portion occupies a rectangular area along a bottom edge of the television broadcast image; and
   said re-scaling means is adapted to scale the main program display portion vertically in top-down fashion in response to said user command.

3. A system according to claim 1, wherein:
   said fixed information band display portion occupies a rectangular area along a top edge of the television broadcast image; and
   said re-scaling means is adapted to scale the main program display portion vertically in bottom-up fashion in response to said user command.

4. A system according to claim 1, wherein:
   said fixed information band display portion occupies a rectangular area along a left edge of the television broadcast image; and
   said re-scaling means is adapted to scale the main program display portion horizontally in right-to-left fashion in response to said user command.

5. A system according to claim 1, wherein:
   said fixed information band display portion occupies a rectangular area along a right edge of the television broadcast image; and
   said re-scaling means is adapted to scale the main program display portion horizontally in left-to-right fashion in response to said user command.

6. A system according to claim 1, further comprising:
   user input means for indicating a location of said fixed information band display portion in said television broadcast image and for controlling said re-scaling means to scale the main program display portion in accordance with said location.

7. A system according to claim 1, further comprising:
   user input means for indicating a size of said fixed information band display portion in said television broadcast image and for controlling said re-scaling means to scale the main program display portion in accordance with said size.

8. A method of eliminating a fixed information band portion of a television broadcast, comprising:
   receiving a television broadcast image, said image having a display area divided into a fixed information band display portion along an edge thereof, and a main program display portion;
   receiving a user command to eliminate said fixed information band display portion from a television display representation of said broadcast image;
   in response to said user command, re-scaling the main program display portion of said television broadcast image in size to occupy substantially the entire display area of said television broadcast image; and
   providing said re-scaled main program display portion for display on a television screen.

9. A method according to claim 8, wherein:
   said fixed information band display portion occupies a rectangular area along a bottom edge of the television broadcast image; and
   the main program display portion is re-scaled vertically in top-down fashion.

10. A method according to claim 8, wherein:
    said fixed information band display portion occupies a rectangular area along a top edge of the television broadcast image; and
    the main program display portion is re-scaled vertically in bottom-up fashion.

11. A method according to claim 8, wherein:
    said fixed information band display portion occupies a rectangular area along a left edge of the television broadcast image; and
    the main program display portion is re-scaled horizontally in right-to-left fashion in response to said user command.

12. A method according to claim 8, wherein:
    said fixed information band display portion occupies a rectangular area along a right edge of the television broadcast image; and
    the main program display portion is re-scaled horizontally in left-to-right fashion in response to said user command.

13. A method according to claim 8, further comprising:
    indicating a location of said fixed information band display portion in said television broadcast image and controlling re-scaling of the main program display portion in accordance with said location.

14. A method according to claim 8, further comprising:
    indicating a size of said fixed information band display portion in said television broadcast image and controlling re-scaling of the main program display portion in accordance with said size.

15. A system for eliminating a fixed information band portion of a television broadcast, comprising:
    a receiver for receiving a television broadcast, said receiver producing a raw pixel stream representative of said broadcast, said raw pixel stream representing a display image having a display area divided into a fixed information band display portion along an edge of said display area and a main program display portion;
    a user input device; and
    a video stretch device, responsive to said user input device and operating on said raw pixel stream to produce an output pixel stream wherein said main program display portion is expanded to occupy substantially all of a display area of a display image represented by the output pixel stream.

* * * * *